July 11, 1933.   J. H. HARDY   1,918,035
TIRE PRESSURE INDICATOR
Filed Nov. 8, 1930   2 Sheets-Sheet 1
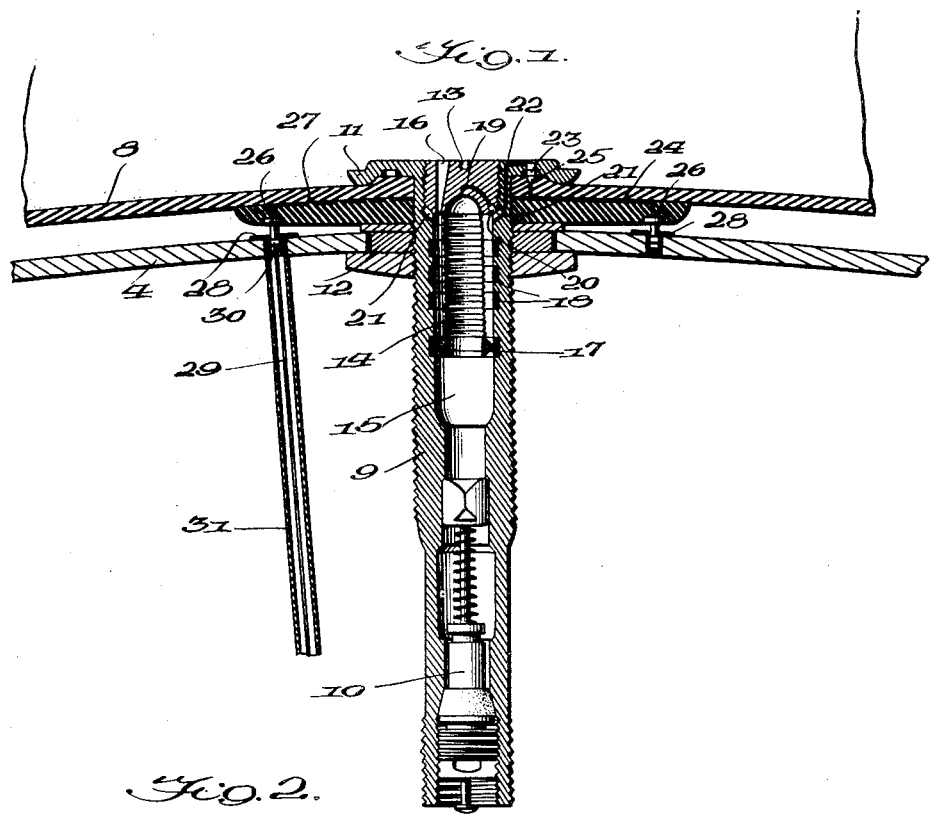
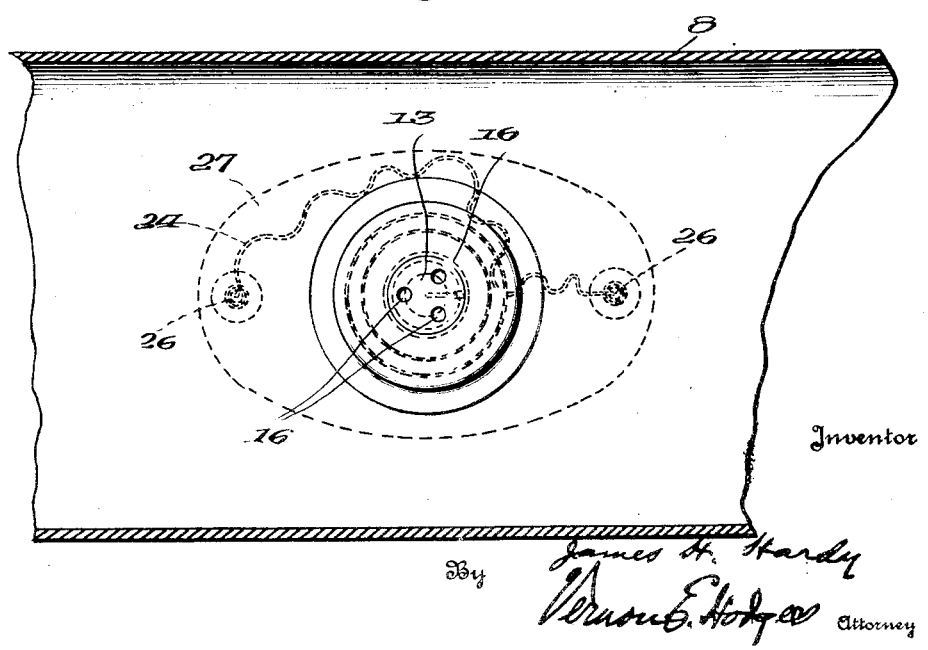

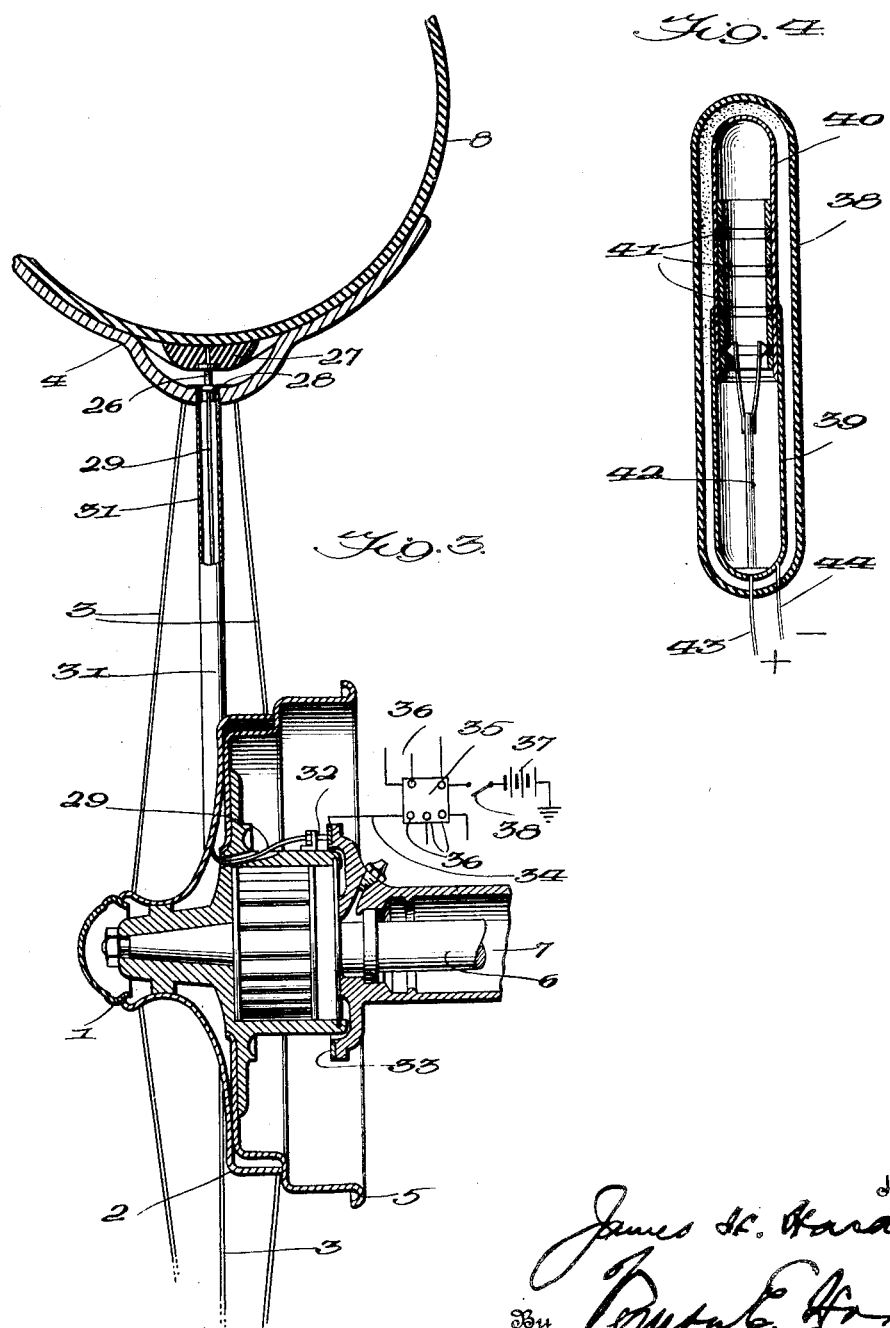

Patented July 11, 1933

1,918,035

UNITED STATES PATENT OFFICE

JAMES HARRIS HARDY, OF CRAWFORD, MISSISSIPPI

TIRE PRESSURE INDICATOR

Application filed November 8, 1930. Serial No. 494,412.

This invention relates to an improvement in tire pressure indicators.

The object of this invention is to improve the manner of indicating tire pressures of automobile tires by automatic means connected with the tube, preferably within the usual valve stem and on the inner side of the valve core for indicating the pressure of the tires and for signalling when an abnormal pressure is reached.

A further object of the invention is to provide a unitary and compact pressure element capable of being inserted on the inner side of the valve core in a valve stem and entirely sealed with a predetermined normal pressure therein, so as to have its outer portion subjected to the pressure of the inner tube of the tire to act on said cell and cause a collapsing or expanding thereof in accordance with predetermined conditions of the tire pressure, and which will indicate the pressure of the tire.

In the accompanying drawings:

Fig. 1 is a sectional view through a portion of a tube and rim and a valve stem, and showing the invention applied thereto;

Fig. 2 is a plan view thereof from the inner side of the tube;

Fig. 3 is a transverse sectional view through a portion of an automobile wheel partly diagrammatically and showing a portion of the invention; and Fig. 4 is a sectional view through a modified form of cell.

While the invention is shown as applied to one of the wheels and tires of an automobile, yet it is understood that there should be a signal provided for each tire, and also if desired for the spare tire, so as to cause an indication of the pressure of each.

As shown in Fig. 3, the wheel is designated generally by the numeral 1 and has the usual hub 2 connected by spokes 3 with a rim 4. The hub 2 is secured to the brake drum 5, which is mounted on the axle 6 and which axle, in the form shown in Fig. 3, extends through an axle housing 7.

As shown in Fig. 1, the inner tube of the tire is designated by the numeral 8 and has a valve stem 9 connected therewith, which valve stem is provided with the usual valve core 10 in the outer end thereof. The inner end of the valve stem 9 has a flange 11 thereon for engaging the inner side of the inner tube to securely hold the valve stem in place and to seal the opening about the valve stem for which purpose the flange 11 cooperates with the nut 12 screwed on the valve stem 9.

A plug 13 of bakelite, vulcanized fibre or other hard insulating material, is screwed into the enlarged internally threaded inner end of the valve stem 9 and carries a sealed cell 14, which extends into a chamber 15 formed in the inner end of the valve stem 9 and on the inner side of the valve core 10, and through which chamber the outer end of the valve stem communicates with the inner tube, openings 16 being formed in the plug 13 to permit said communication. The cell 14 is preferably hermetically sealed and contains a predetermined internal pressure and is collapsible in order that it may expand and collapse according to the relative internal pressure and the pressure of the inner tube which acts thereon. This cell 14 may be of thin flexible metal or of rubber, or other suitable material as may be found desirable for the purpose.

The outer end of the cell 14 carries contact elements 17, engaging the side walls of the chamber 15 of the valve stem 9, and embedded in said walls are strips of insulation 18 spaced apart and adapted to be engaged by the contacts 17 for insulating the contacts 17 from the valve stem during contraction or expansion of the cell 14.

The inner end of the cell 14 has a wire 19 connected therewith and which is adapted to be electrically connected either through the walls of the cell or otherwise with the contact 17, and this wire 19 is also connected with a contact 20 in position to engage a contact ring 21 carried by the valve stem and insulated therefrom. The contact ring 21 is also connected through a wire 22 extending through a portion of the inner end of the valve stem to an insulated contact ring 23, which is mounted in the inner side of the flange 11. A wire 24 extends from the contact 25 engaging the contact ring 23 to one or more contact plugs 26 disposed about the valve stem 9 and which wire 24 is disposed between the inner tube 8 and the strip 27 of rubber or the like, which strip also carries the plugs 26.

The rim 4 of the wheel has an insulating socket 28 formed therein, one for each of the plugs 26, and a wire 29 extends to at least on of said sockets where it is connected with the contact plate 30, which may be of solder or the like and which serves not only to be engaged by the plug 26 but also to hold the wire 29 in place and form an effective connection between said wire and the plug 26.

A tubular casing 31 extends from the insulating socket 28 and enclosing the wire 29 to the hub 2 of the wheel, through which the wire 29 extends and is connected with a brush 32 in position to engage an insulated contact ring 33 carried by the axle housing 7. A wire 34 extends from the ring 33 to a signal panel 35 having a plurality of lights 36 or other signal elements mounted thereon for causing a signal indication when a circuit is closed through the wires 29 and 34 to a battery 37. A switch 38 may be provided for controlling the circuits. One side of the battery 37 may be grounded, while the opposite side may thus be connected with the contact 17 for closing the circuit through the valve stem 9 and the wheel, which thus grounds the contacts 17 on the other side.

When the inner tube contains its normal pressure, the contacts 17 will engage one of the insulating segments 18 in the valve stem 9, and maintain the circuit through the corresponding signal 36 broken until the pressure is decreased in the tire sufficiently to cause the contacts to be moved off of the insulating segment 18 and to engage the inner wall of the valve stem 9, thus grounding the one side of the battery 37 and closing the electrical circuit through the signal 36 to energize the signal and indicate that the pressure in the tire has become decreased to an abnormal condition.

The construction of the plug 13 of hard insulating material, such as bakelite or the like, permits it to be threaded and screwed into the inner end of the valve stem 9, and also to insulate the contact 20, holding said contact in position to engage the contact ring 21 when the plug 13 is screwed entirely into the inner end of the valve stem, thus effectively forming a contact between the parts.

The purpose of having the separate contact plugs 26 on opposite sides of the valve stem 9 is to permit contact to be made with the wire 29, regardless of which way the inner tube may be put on the rim, and making it unnecessary to definitely ascertain in which manner it should be placed on the rim.

In the form of cell shown in Fig. 4, it is constructed of a rubber or resilient sack 38 having inner telescoping sections 39 and 40 carried by the bag 38, and one of said sections has a plurality of insulating segments 41 while the other section 39 carries a contact arm 42 in position to engage the segment 40 and the insulating elements 41 as the tube collapses or is expanded, to form an electrical connection between the contact arm 42 and the telescoping member 39, from which said contact arm is insulated at its point of support.

A wire 43 may be connected with the contact arm 42, while a wire 44 is connected with the telescoping member 39. One of said wires may extend to and be grounded through the valve stem and the wheel, while the other wire extends to the signal device and one side of the battery, the opposite side of which battery is also grounded.

The cell thus shown in Fig. 4 may be substituted for the cell 14 in the inner end of the valve stem 9, as shown in Fig. 1 if desirable.

I claim:

1. In a device of the character described, the combination of a rim having an opening, sockets disposed on opposite sides of said opening, an inner tube having a stem, circuit breaking means connected with the stem, and plugs on opposite sides of the stem in position to engage the sockets, said plugs being connected with the circuit breaking means.

2. A tire pressure indicator comprising a valve stem having a recess therein, said recess having alternate bands of contact and insulation in the inner face thereof, and a collapsible pressure responsive cell mounted in the recess and carrying a contact on its movable portion in position to engage the contact bands according to the pressure to which it is exposed.

3. A pressure indicator comprising a casing having a plurality of alternate strips of contact and insulation in a face thereof, and a pressure responsive element associated with said casing and having a movable portion carrying a contact in position to alternately engage the strips of contact and insulation according to the pressure to which it is exposed.

4. A tire pressure indicator comprising a stem having a passageway therethrough, a plug fitted in the inner end of the passageway, means arranged in the passageway for movement in response to the pressure in the tire, and carrying a circuit closing element, a second circuit closing element in position to be engaged thereby, a contact carried by the plug and connected with the first-mentioned circuit closing element, and contact means carried by the stem in position to be engaged by said plug contact.

5. A tire pressure indicator comprising a valve stem having a direct air passageway therethrough, adapted to have a valve seated in the outer end thereof, a plug fitted in the inner end of the passageway and having one or more openings therethrough into the passageway, a sealed cell carried by said plug in the air passageway and having the walls thereof spaced from the walls of the passageway providing uninterrupted flow of air through the portion of the passageway housing the cell, one end of said cell being attached to the plug and the other end being unattached and movable lengthwise of the passageway in response to variations in the pressure in the tire, for causing an indication of the tire pressure.

In testimony whereof I affix my signature.

JAMES HARRIS HARDY.